Patented July 21, 1931

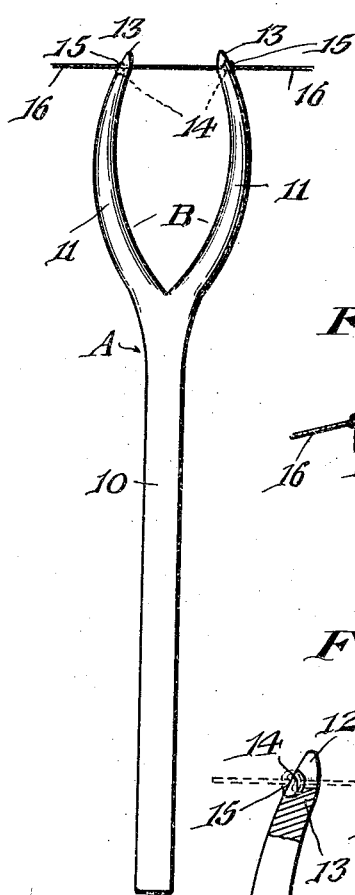
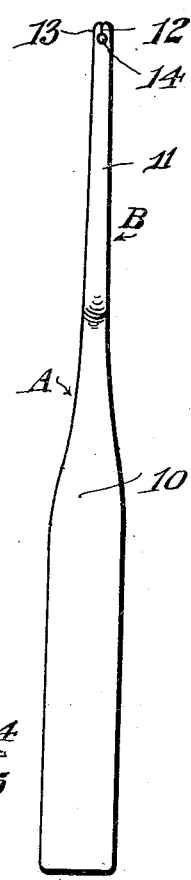
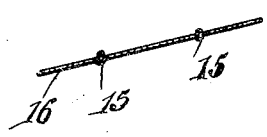
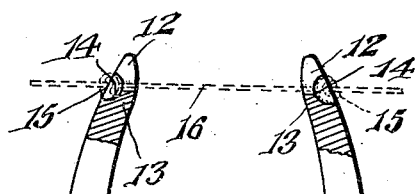
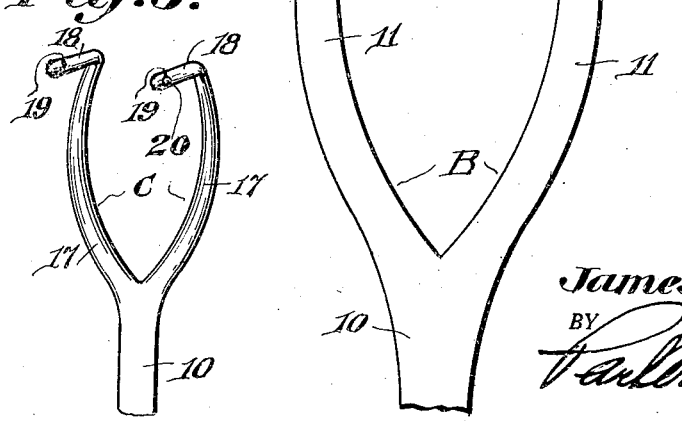

1,815,408

UNITED STATES PATENT OFFICE

JAMES K. JORDAN, OF ATLANTA, GEORGIA

DENTAL FLOSS HOLDER

Application filed March 29, 1929. Serial No. 350,930.

The invention relates to a hand implement for use in removing substances from between the teeth, and more especially to a dental floss holder.

The primary object of the invention is the provision of a holder of this character, wherein a length of dental floss can be conveniently held under tension, so that it can be inserted with dispatch between teeth adjacent to each other, so as to remove any substances or foreign matter accumulated therebetween, the length of floss being firmly held without liability of detachment thereof from the holder or possible slipping of said floss during the use thereof.

Another object of the invention is the provision of a holder of this character, wherein the construction thereof is novel in form, so as to permit the application of a length of floss thereto and its removal therefrom with ease and dispatch.

A further object of the invention is the provision of a holder of this character, wherein the end of a length of floss is anchored in the engaging arms of the holder in a novel manner, so that said ends will not interfere in the use of the holder when the length of floss is brought into action for the removal or dislodging of materials about proximal surfaces of the teeth, the holder being of a kind to assure easy use of the floss and to facilitate the insertion of said dental floss between the teeth for cleaning purposes.

A still further object of the invention is the provision of a holder of this character, which is extremely simple in construction, thoroughly reliable and efficient in its purposes, strong, durable, and inexpensive to manufacture.

With these and other objects in view the invention consists in the features of construction, combination and arrangement of parts as will be hereinafter more fully described, illustrated in the accompanying drawings which show the preferred embodiments of the invention, and pointed out in the claim hereunto appended.

In the accompanying drawings:

Figure 1 is an elevation of a dental floss holder constructed in accordance with the invention.

Figure 2 is an edge elevation.

Figure 3 is a perspective view of a length of dental floss detached from the holder.

Figure 4 is an enlarged fragmentary vertical sectional view through the arms of the holder.

Figure 5 is a perspective view of a modified form of holder constructed in accordance with the invention.

Similar reference characters indicate corresponding parts throughout the several views of the drawings.

Referring to the drawings in detail, particularly Figures 1 to 4, inclusive, the holder comprises a frame A, including a handle portion 10, of the required length and can be of any special design or configuration to suit the fancy of the manufacturer or user. This handle portion 10 from its outer free end toward the inner end thereof is preferably tapered and said inner end merges into a fork B, having outwardly curved opposed resilient tines or arms 11, which also taper toward their free ends.

Each tine or arm at its free end is slitted to provide a bifurcation 12, which extends for a distance and is disposed entirely through said free end transversely to intersect the space between the tines or arms.

Each tine or arm 11, at its outer edge 13, near the free end thereof is provided with a notch or recess 14, into which the bifurcation intersects or merges, and this notch or recess is of a size and shape to accommodate a knot 15, formed in a length of dental floss 16, the stretch of the latter between the knots 15, formed therein at both ends being slightly less than the normal distance between the tines or arms 11, prior to compressing the same during the act of attaching the dental floss thereto. As stated these arms or tines are resilient and after the knots 15, have been formed in the length of floss 16, the said arms are compressed so as to yield toward each other and the stretch of floss between the knots 15, is inserted through the slits 12 in the free ends of the tines or arms 11, so that when the latter are released the knots 15, will automatically engage in and be seated within the recesses or notches 14, in said tines or arms. Thus the length of floss 16, will be held under tension while the knots will be maintained securely anchored in the recesses or notches 14, in the tines or arms 11, of the holder.

In Figure 5 of the drawings there is shown a slight modification of the dental floss holder, wherein the fork C, thereof is of arch formation, and its arms 17, at their free ends are provided with lateral extensions or ears 18, these being slitted at 19, and in their outer faces are notches or recesses 20, with which the slits 18, intersect or merge, the recesses or notches being provided to accommodate the knots heretofore described in the length of dental floss. This holder has inserted therein the floss 16, in an identical manner to the insertion thereof in the holder A, hereinbefore described.

What is claimed is:

The combination with a length of dental floss having knots spaced from each other, of a holder forming a fork having resilient tines outwardly bulged with their free ends converging, each end having a straight bifurcation opening through the same and a socket merging into the inner end of said bifurcation and located at the outer side of said tine removed from its extremity, whereby the knots will become seated in the sockets when the floss has been inserted in the bifurcations and tensioned in bridging relation to the fork.

In testimony whereof I affix my signature.

JAMES K. JORDAN.